United States Patent
Shoham

(10) Patent No.: US 7,350,208 B1
(45) Date of Patent: *Mar. 25, 2008

(54) METHOD AND APPARATUS FOR SCHEDULING USING A RESOURCE VARIABLE DECREASED BY AMOUNTS CORRESPONDING TO THE EFFICIENCY OF THE RESOURCE

(75) Inventor: Doron Shoham, Shoham (IL)

(73) Assignee: Cisco Technology, Inc., San Jose, CA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 10/334,579

(22) Filed: Dec. 31, 2002

(51) Int. Cl.
*G06F 9/46* (2006.01)
(52) U.S. Cl. .......... 718/102; 718/104
(58) Field of Classification Search ........ 370/412; 718/1, 102, 104; 709/223–226
See application file for complete search history.

(56) References Cited

U.S. PATENT DOCUMENTS

| 7,065,091 B2 | 6/2006 | Shoham et al. |
| 7,212,535 B2 | 5/2007 | Shoham et al. |
| 2003/0103514 A1* | 6/2003 | Nam et al. .......... 370/412 |

OTHER PUBLICATIONS

C. Partridge, "A Proposed Flow Specification," RFC 1363, Sep. 1992, 20 pages.
Craig Partridge, Gigabit Networking, Addison Wesley Longman, Inc. 1994, pp. 253-263.
M. Shreedhar and George Varghese, "Efficient Fair Queuing Using Deficit Round-Robin," Proc. SIGCOMM' '95 Cambridge, MA, ACM, 1995, pp. 231-242.
M. Shreedhar and George Varghese, "Efficient Fair Queuing Using Deficit Round-Robin," IEEE/ACM Transactions on Networking, vol. 4, No. 3, Jun. 1996, pp. 375-385.
Sugih Jamin et al., "A Measurement-Based Admission Control Algorithm for Integrated Service Packet Networks," IEEE/ACM Transactions on Networking, vol. 5, No. 1, Feb. 1997, pp. 56-70.
Grenville Armitage, Quality of Service in IP Networks: Foundations for a Multi-Service Internet, Macmillan Technical Publishing, Apr. 2000, pp. 35-104.
George Coulouris et al., Distributed Systems: Concepts and Design, Third Edition, Addison-Wesley, 2001, pp. 607-633.
S. Keshav, An Engineering Approach to Computer Networking: ATM Networks, the Internet, and the Telephone Network, Addison Wesley Longman, Inc. 1997, Chapter 9, pp. 209-263.

* cited by examiner

*Primary Examiner*—Meng-Al T. An
*Assistant Examiner*—Eric C Wai
(74) *Attorney, Agent, or Firm*—The Law Office of Kirk D. Williams

(57) ABSTRACT

Methods and apparatus are disclosed for scheduling items in a system, such as, but not limited to a computer or communications system. An item is identified and processed. A processing amount (e.g., token bucket, deficit, or any other measure of allowed processing) is decreased by a value. A resource bucket is reduced by a first amount if the processing of the item was efficient (e.g., the processing equaled or exceeded a threshold amount or any other measure or determination.) Otherwise the resource value is decreased by a second amount. A determination is made whether the processing amount and the resource bucket allow the item to be further processed. In one implementation, the first amount is one and the second value is approximately one-half of the resource value. In one implementation, the item represents a queue and the processing of the item includes sending one or more packets. In one implementation, the item represents a process, thread, or information stream.

29 Claims, 8 Drawing Sheets

__US 7,350,208 B1__

METHOD AND APPARATUS FOR SCHEDULING USING A RESOURCE VARIABLE DECREASED BY AMOUNTS CORRESPONDING TO THE EFFICIENCY OF THE RESOURCE

FIELD OF THE INVENTION

This invention especially relates to scheduling of information and/or processes, such as those used in communications and computer systems; and more particularly, the invention relates to scheduling entities and items using a resource variable decreased by amounts corresponding to the efficiency of the resource, for use including, but not limited to the scheduling of the sending of packets in a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet. For example, a enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

When there is a contention for resources, such as on output links of a packet switching system or interface or even for compute cycles in a computing device, it is important for resources to be allocated or scheduled according to some fairness policy. Moreover, the amount of work required to schedule and to enqueue and dequeue a packet or other scheduled item is important, especially as the operating rate of systems increase.

Ordinary round-robin (RR) is an algorithm commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly.

In some scenarios, high priority (e.g., low latency), guaranteed bandwidth, best effort traffic (e.g., spare bandwidth) and other classifications of traffic compete for a common resource. Various known scheduling algorithms are designed to provide isolation, prioritization, and fair bandwidth allocation to traffic competing for a common resource. These are known as fair queuing algorithms. Some examples are Weighted Fair Queuing (WFQ), Self-Clocked Fair Queuing (SCFQ), and Deficit Round Robin/Surplus Round Robin (referred to as DRR).

WFQ, and SCFQ depend upon arrival times as well as previous link utilization in order to calculate the next best packet to send. The accepted "ideal" behavior is bit-by-bit round robin, which states that the next packet to send should be the packet which would have completed if all packets currently in the system send one bit each round robin (which is typically not practical in a packet based system). The inclusion of arrival times in the scheduling algorithm, in order to calculate theoretical ideal departure times, typically requires insertion into a sorted list which is known to be an $O(\log N)$ problem worst case where N is the number of packets already enqueued.

DRR is an algorithm used for sharing a common resource between several clients with different ratios between clients (i.e., some clients are allowed to consume more of the resources than others). The ratio between clients is typically defined by a parameter called a quantum.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will send an equal amount of bandwidth.

This DRR approach works in rounds, where a round is one round-robin iteration over the queues that have items to be sent. Typically, when the queue is scheduled, it is allowed to transmit until its deficit becomes negative, and then the next queue is served. Packets coming in on different flows are stored in different queues. Each round, each queue is allocated a quantum worth of bits, which are added to the deficit of each queue. Each queue is allowed to send out one or more packets in a DRR round, subject to the restriction that it cannot send more bits than indicated by the deficit corresponding to the queue. If there are no more packets in a queue after the queue has been serviced, the deficit corresponding to the queue is set to zero. Otherwise, the remaining amount (i.e., the deficit minus the number of bits sent) is maintained for the next round.

DRR is an algorithm that does not depend upon actual arrival times and has complexity of O(1)—that is the amount of work required is a constant and independent of the number of packets enqueued. In order to be work conserving, a packet should be sent every time a queue is scheduled. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal". In particular, latency for a system with N queues is Q*N where Q is the average quantum, which must be at least one maximum transport unit (MTU).

In one implementation, called modified deficit round robin (MDRR), there is optionally one high priority (HP) client mapped to each resource, in addition to the other non-high priority (NHP) clients mapped to the resource. In this implementation there are two possible modes of operation: low latency mode and fair mode. In low latency mode, the HP client is constantly served until it is not eligible (i.e., either it has an empty queue or it had exceeded its allocated bandwidth). The NHP clients are only served whenever the HP client can't be served. Low latency mode reduces the latency of the HP client (good for voice/video applications), but can cause starvation of NHP clients. In fair mode, one packet is sent from the HP client and one from other NHP clients in alternating order as long as the HP client didn't reach its maximum allocated bandwidth. Fair mode is a one compromise point between the requirement not to starve NHP clients and the low latency requirement of HP clients.

In addition to the above described fair queuing algorithm, there is another approach using token buckets that is used to shape traffic. At the start of each cycle, which may be initiated upon expiration of a timer or automatically after a previous cycle is completed, each client is given additional tokens where the tokens represent a number of packets or bytes that a client can send. Thus, the bandwidth allocated to a client is dependent on the number of tokens, and different clients may be given different amounts of tokens. When served, each client is permitted to send the number of packets or bytes or information corresponding to the number of tokens it currently possesses.

In some applications, known scheduling techniques may not result in a sustained volume of processing. For example, in certain situations, a line card has a requisite output packet bandwidth it must sustain to keep up with incoming traffic or for other reasons. These packets may be of varying size and arrival rates. The overhead in scheduling the sending of packets may be of such a nature, that if a certain number of packets or bytes are not sent on the average for each scheduling event, this requisite rate may not be accomplished. Thus, needed are new methods and apparatus for scheduling of processes, such as, but not limited to packets in a packet switching system, which may provide improved performance and/or have other desirable characteristics.

SUMMARY OF THE INVENTION

Methods and apparatus are disclosed for scheduling items in a system, such as, but not limited to a computer or communications system. In one embodiment, an item is identified and processed. A processing amount (e.g., token bucket, deficit, or any other measure of allowed processing) is decreased by a value. A resource bucket is reduced by a first amount if the processing of the item was efficient (e.g., the processing equaled or exceeded a threshold amount or any other measure or determination.) Otherwise the resource value is decreased by a second amount. A determination is made whether the processing amount and resource bucket allow the item to be further processed. In one embodiment, the first amount is one and the second value is approximately one-half of the resource value. In one embodiment, the item represents a queue and the processing of the item includes sending one or more packets. In one embodiment, the item represents a process, thread, or information stream. In one embodiment, a group including processing the item, decreasing the processing amount, decreasing the resource value, and determining whether the item is to be further processed is repeatedly performed until it is determined that the processing amount and/or the resource value do not allow the item to be further processed.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
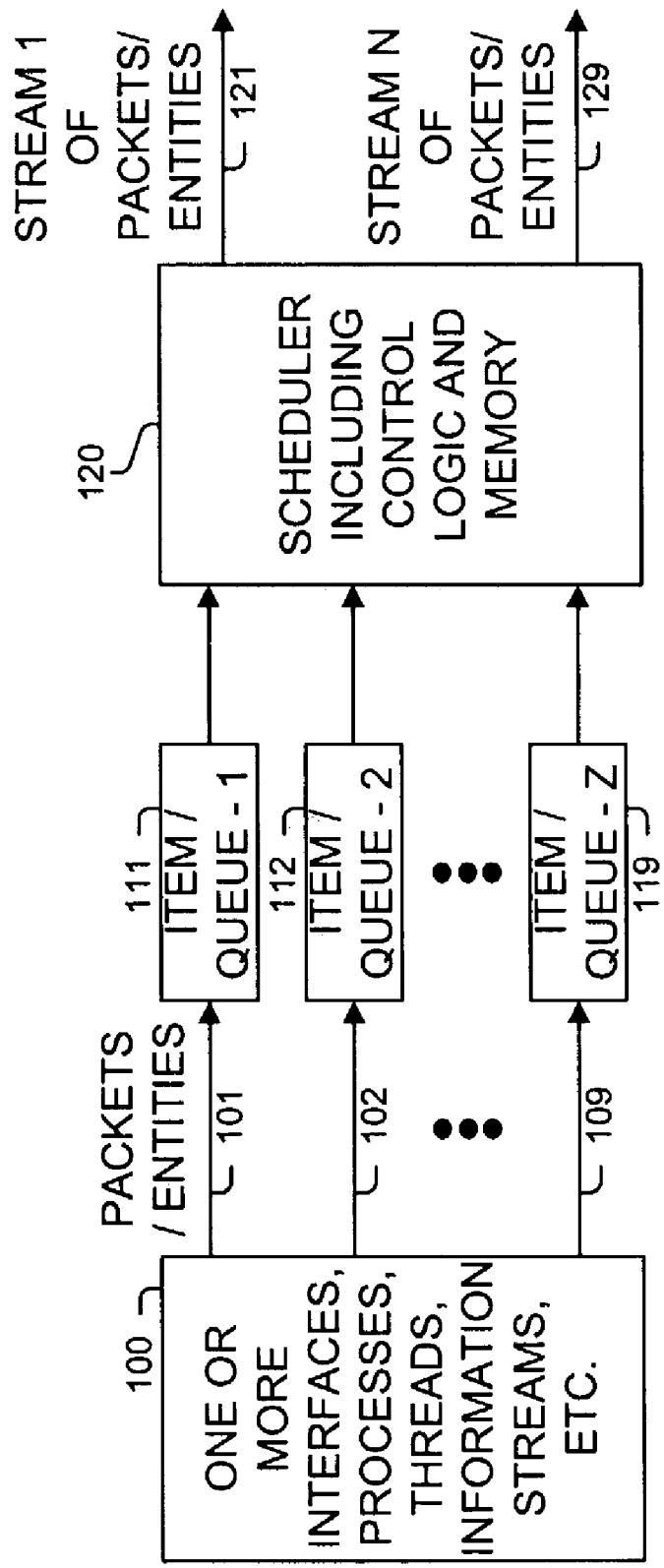
FIG. 1 is a block diagram of one embodiment for scheduling entities and items using a resource value.

Methods and apparatus are disclosed for scheduling entities and items using a resource variable decreased by amounts corresponding to the efficiency of the resource, for use including, but not limited to the scheduling of the sending of packets in a packet switching system. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for scheduling entities and items using a resource variable decreased by amounts corresponding to the efficiency of the resource, for use including, but not limited to the scheduling of the sending of packets in a packet switching system. In one embodiment, a resource value is used to give priority to those resources that are efficiently sending (e.g., those resources sending a minimum number of bytes or packets per scheduled event such that a minimum transmission rate can be sustained.) In one embodiment, an entity can be processed if it has the requisite number of tokens, the resource value is positive, and it has an item to be processed. In one embodiment, the resource value is decreased by a first amount for each processing performed efficiently, and by a larger second amount for non-efficient processing. Thus, the entity is not starved, but the number of times that it can send during a scheduling cycle is decreased when it performs inefficient processing.

In one embodiment, an item is identified and processed. A processing amount (e.g., token bucket, deficit, or any other measure of allowed processing) is decreased by a value. A resource bucket is reduced by a first amount if the processing of the item was efficient (e.g., the processing equaled or exceeded a threshold amount or any other measure or determination.) Otherwise the resource value is decreased by a second amount. A determination is made whether the processing amount and resource bucket allow the item to be further processed. In one embodiment, the first amount is one and the second value is approximately one-half of the resource value. In one embodiment, the item represents a queue and the processing of the item includes sending one or more packets. In one embodiment, the item represents a process, thread, or information stream. In one embodiment, a group including processing the item, decreasing the processing amount, decreasing the resource value, and determining whether the item is to be further processed is repeatedly performed until it is determined that the processing amount and/or the resource value do not allow the item to be further processed.

In one embodiment, one or more sets of items requiring processing to be performed are maintained. A current set is identified and each of the items in the current set is processed. This processing may include, but is not limited to identifying a particular item in the current set, processing an entity corresponding to the particular item, decreasing the processing amount of the particular item by a value, decreasing a resource value by a first amount if the processing of the entity equaled or exceeded a threshold otherwise decreasing the resource value by a second amount, and determining if the processing amount and the resource value allow the particular item to be further processed. In one embodiment, the first amount is one and the second value is approximately one-half of the resource value. In one embodiment, each of the items in the multiple sets of items represents a queue. In one embodiment, the entity represents a packet. In one embodiment, the entity represents a process, thread, or information stream.

One embodiment includes multiple queues for buffering packets, and a scheduler to perform scheduling of the sending of packets. The scheduler typically includes, but is not limited to including control logic and one or more memory devices configured to maintain a multiple sets of indications of queues requiring processing to be performed.

In one embodiment, this scheduling includes identifying a queue, processing the queue (e.g., sending one or more packets, etc.), decreasing a processing amount by a value corresponding to the number of packets or bytes of packets sent (or some other measurement or constant value), decreasing a resource value by a first amount if the processing of the queue equaled or exceeded a threshold (e.g., at least some n minimum number of packets were sent), otherwise decreasing the resource value by a second amount, and determining if the processing amount and the resource value allow the queue to be further processed.

In one embodiment, this scheduling includes identifying a current set of indications, and processing queues corresponding to the one or more indications of queues in the current set. In one embodiment, this processing includes identifying a particular indication of a particular queue in the current set, sending a packet from the particular queue corresponding to the particular indication, decreasing the processing amount by a value, decreasing a resource value by a first amount if the processing of the entity equaled or exceeded a threshold otherwise decreasing the resource value by a second amount, determining if the processing amount and the resource value allow the particular queue to be further processed, and moving the particular indication from the current set to another of the sets of indications of queues after the determining if processing amount allows the particular queue to be further processed.

FIG. 1 illustrates one embodiment of a system such as, but not limited to a computer or communications system, which schedules entities and/or items using a resource value according to the invention. Packets or other entities or indications thereof 101-109 to be scheduled are received from one or more interfaces, processes, threads, information streams, or other sources 100. These packets or other entities 101-109 are typically stored in items/queues 111-119 for scheduling by scheduler 120. In one embodiment, such as that processing packets or communication streams, scheduler 120 processes one or more streams of packets or other entities 101-109 to produce one or more streams of outputs 121-129. For example, in one embodiment, streams of packets 101-109 are stored in queues 111-119. Scheduler 120 schedules packets from queues 111-119 to produce one or more streams of packets 121-129.

Figure 2:
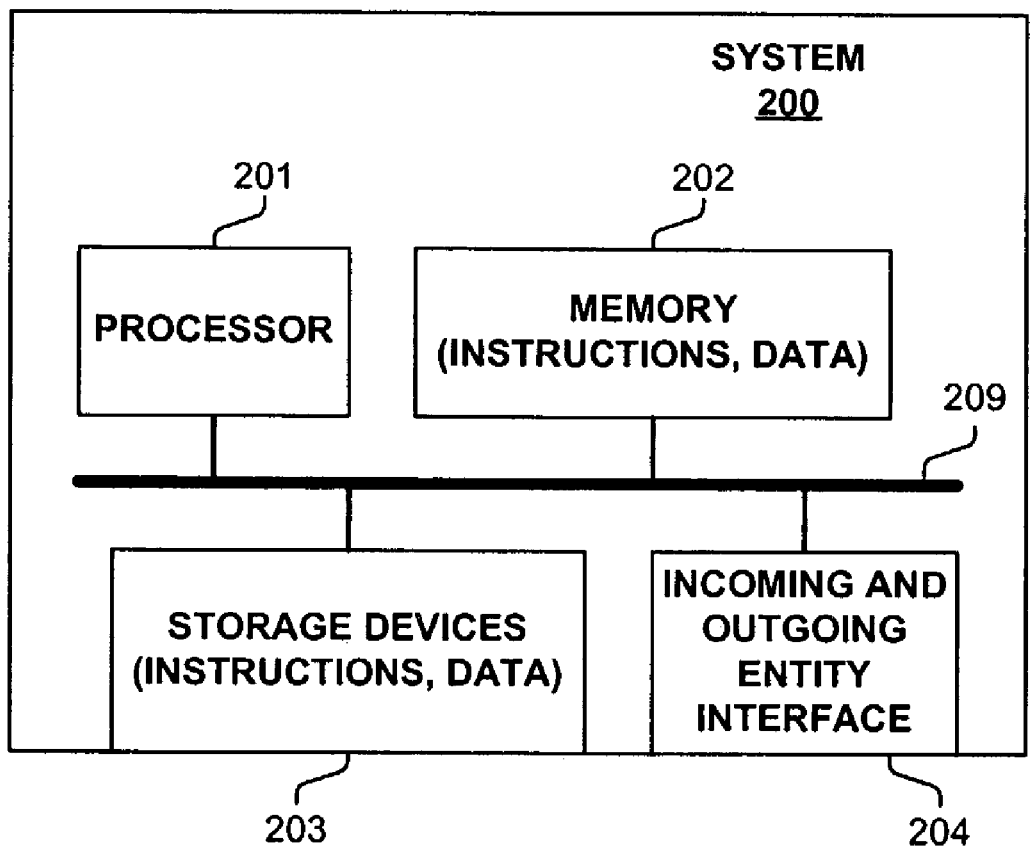
FIG. 2 is a block diagram of one embodiment for scheduling entities and items using a resource value.

FIG. 2 illustrates one embodiment of a system 200 such as, but not limited to a computer or communications system, scheduling entities and/or items using a resource value according to the invention. In one embodiment, system 200 schedules internally generated entities, such as, but not limited to processes, threads, information streams, packets or other entities. In one embodiment, system 200 receives externally generated entities and/or internally generates entities, and schedules the processing and/or sending of these entities by system 200 or by another system. For example, in one embodiment, system 200 schedules internal processes, threads, etc. In one embodiment, system 200 receives streams of packets (or other information units), schedules packets belonging to these streams, and generates one or more external streams of scheduled packets.

In one embodiment, system 200 includes a processor 201, memory 202, storage devices 203, and optionally one or more incoming and/or outgoing entity interface 204, which are typically coupled via one or more communications mechanisms 209 (shown as a bus for illustrative purposes). Various embodiments of system 200 may include more or less elements. The operation of system 200 is typically controlled by processor 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processor 201 and/or data which is manipulated by processor 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processor 201 and/or data which is manipulated by processor 201 for implementing functionality in accordance with the invention.

Figure 3A:
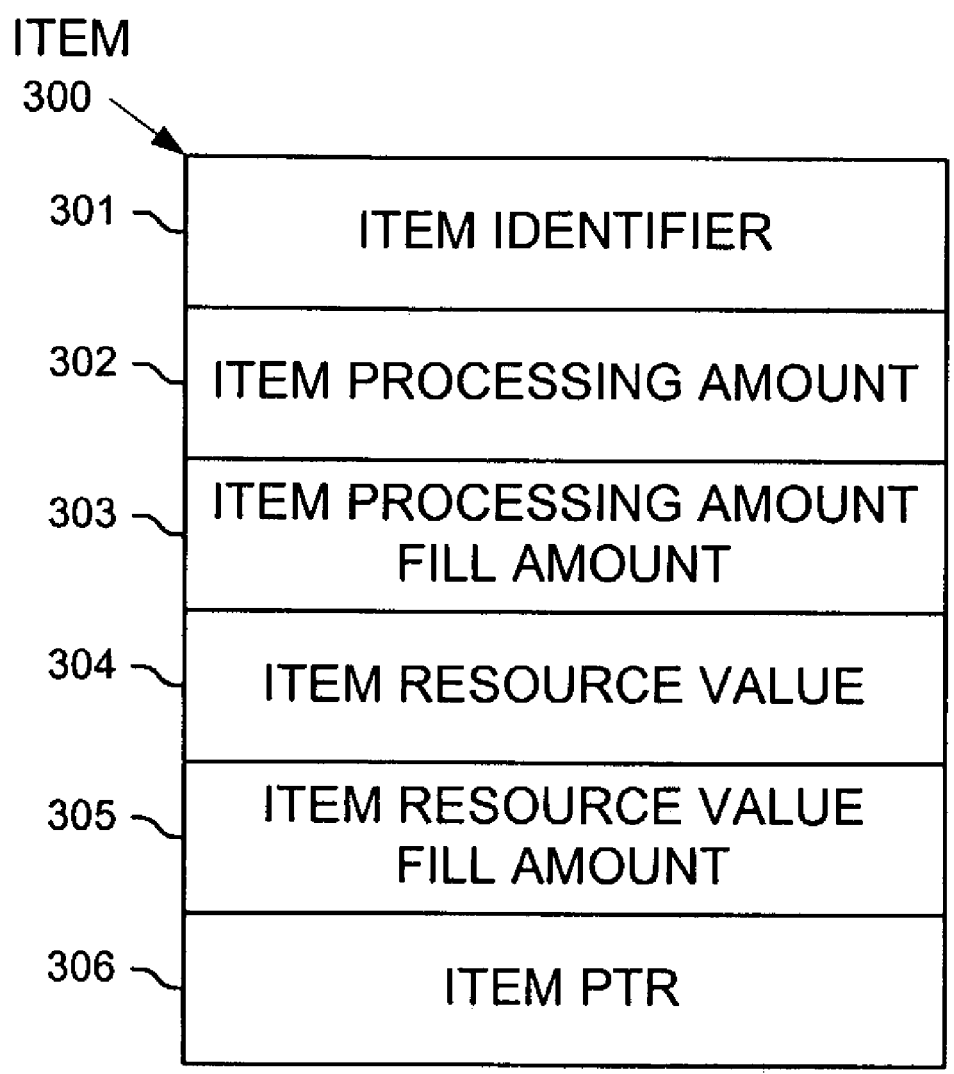
FIGS. 3A-C are block diagrams of data structures used in one embodiment.
Figure 3B:
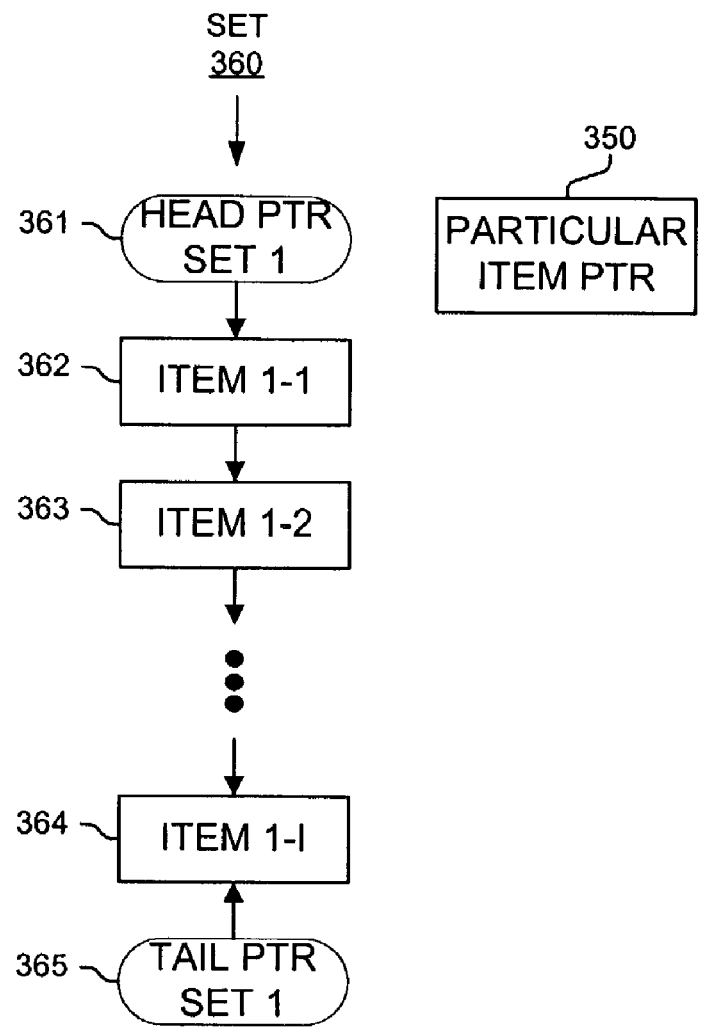
Figure 3C:
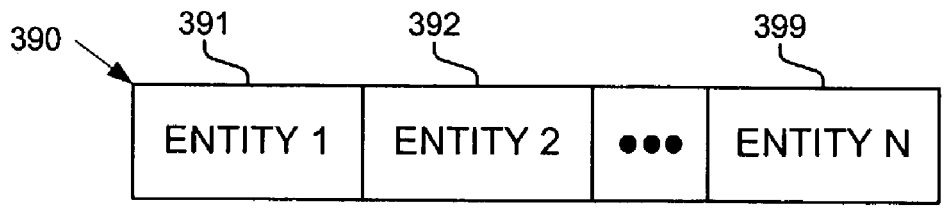

FIGS. 3A-3C illustrate exemplary data structures used in one or more of an unlimited number of embodiments of the invention. FIG. 3A illustrates a data structure used by to identify an item and to maintain a processing amount for the item. One embodiment uses all fields 301-306 of data structure 300. One embodiment uses less than all of fields 301-306 of data structure 300.

As shown, item data structure 300 includes an item identifier field 301 used to indicate the particular item (e.g., a set of queues or other items), an item processing amount field 302 used to maintain a processing amount for the item, an item processing amount fill amount field 303 used to indicate a processing amount fill amount for the item as processing amount fill amount values in one embodiment may vary between items to provide varying amounts of bandwidth, processing time, etc. for the items (and if they are the same, then item processing amount fill amount field 303 is typically not used or included), an item resource value field 304 used for maintaining a resource value corresponding to the item, an item resource value fill amount field 305, and an item pointer field 306 used in a linked list of items, such as that illustrated in FIG. 3B.

FIG. 3B illustrates a sets of items 360 including having items 362-364, which require processing to be performed. In one embodiment, items 362-364 correspond to queues containing packets or other entities to be processed. In one embodiment, items 362-364 correspond to processes or threads requiring CPU time. As shown, set 360 is in the form of a linked list (and numerous other data structures are used in other embodiments.) A linked list is convenient for maintaining an ordered set (e.g., a list) of items. In the embodiment illustrated, each list or set 360 has a head pointer 361 and a tail pointer 365. In one embodiment, a particular item pointer 350 is used to indicate one of the items 362-364 currently being processed.

FIG. 3C illustrates a data structure comprising an item 390 used in one embodiment. As shown, item 390 comprises multiple entities 391-399. In one embodiment, item 390 corresponds to a queue, and entities 391-399 correspond to packets to be scheduled and sent. In one embodiment, an entity corresponds to a unit of work performed on an item.

Figure 4:
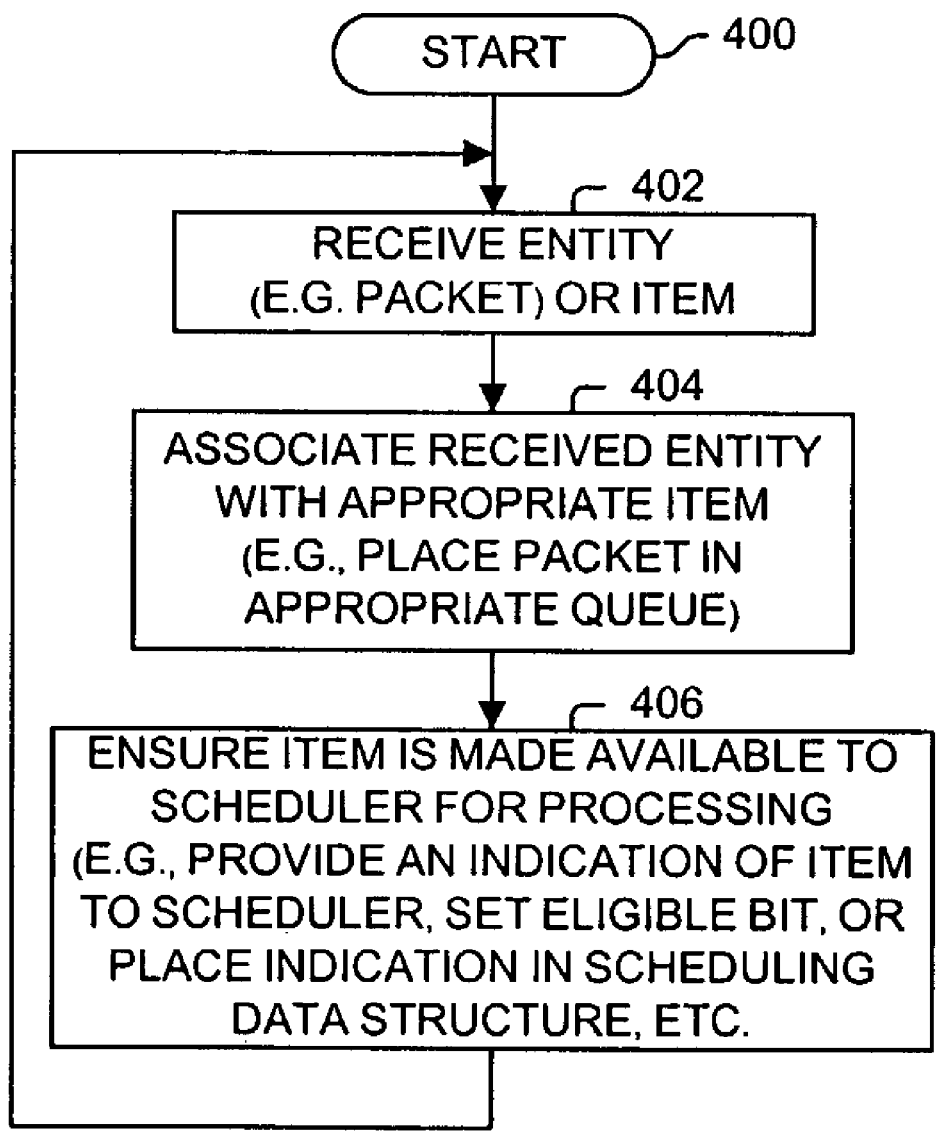
FIG. 4 is a flow diagram of a process used in one embodiment for receiving items or entities associated with items.

FIG. 4 illustrates a process used in one embodiment for receiving items or entities associated with items. Processing begins with process block 400, and proceeds to process block 402, wherein an item (or indication thereof) an entity (or indication thereof) requiring processing is received. In process block 404, the entity is associated with the appropriate item (e.g., a packet is placed in a queue, a thread is associated with a process, etc.) Note, in one embodiment, items to do not include identifiable entities, and thus, this process block would not be performed. Next, in process block 406, the item is ensured to be made available to the scheduler for processing, such as, but not limited to providing an indication of the item to the scheduler, setting a processing eligibility bit, or placing an indication in a scheduling data structure, etc. In one embodiment, this step is not performed as the scheduler automatically becomes aware of those items available for scheduling. Processing returns to process block 402.

Figure 5:
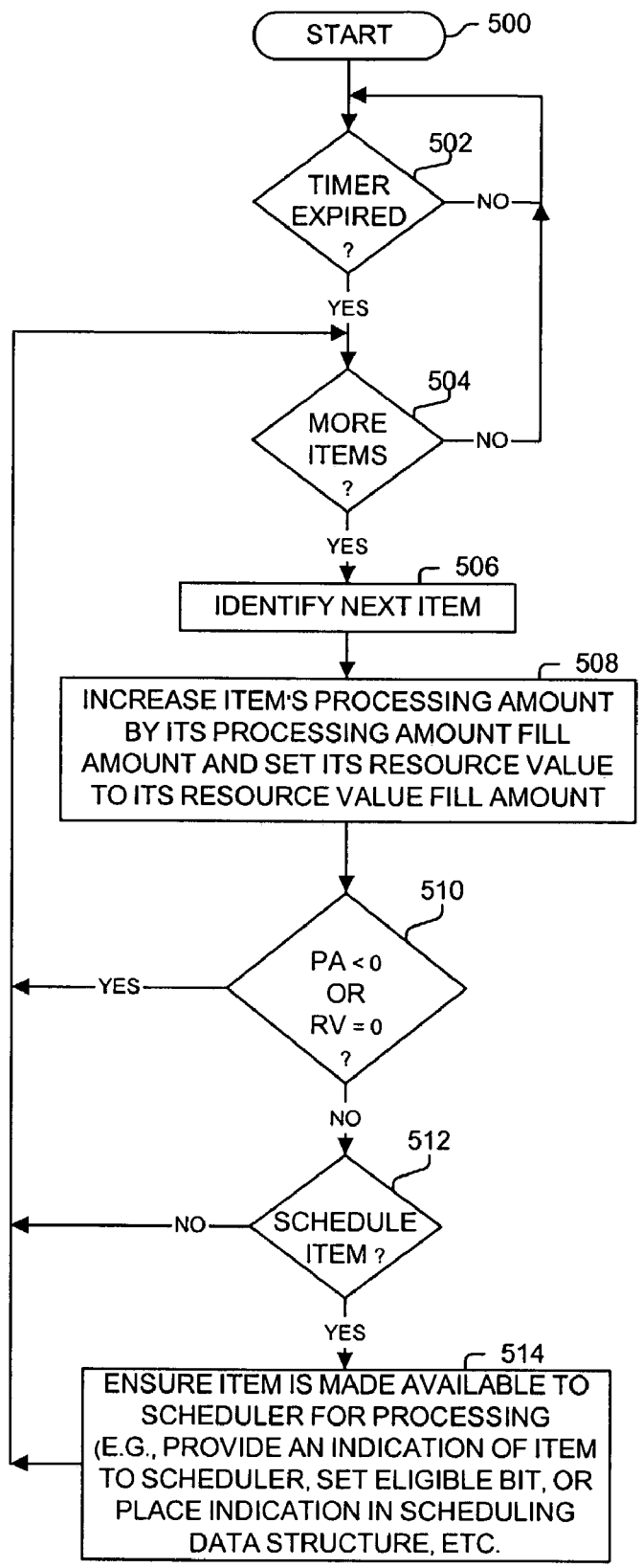
FIG. 5 is a flow diagram of a process used to update each item's processing amount and its resource value and to ensure a scheduler is aware of an item which is able to be processed.

FIG. 5 is a flow diagram of a process used to update each item's processing amount and its resource value and to ensure a scheduler is aware of an item which is able to be processed. Processing begins with process block 500, and proceeds to process block 502, wherein it waits for the expiration of a timer, typically a periodic timer. Upon expiration of the timer, in process blocks 504-514, each of the items are manipulated to initialize its resource value and to increase its processing amount. In one embodiment, all items are so manipulated, whether or not they require processing (e.g., queues that are empty or have packets, or the processes which are stalled or not stalled, etc.); while in one embodiment, only those items requiring processing (e.g., queues with packets, non-stalled processes, etc.) are so manipulated. The former mechanism allows items to accumulate additional processing amount even when it has no processing on it to be performed.

Proceeding to process block 504, if there are more items to manipulate, then in process block 506, a next (or the first) item is identified. Next, in process block 508, the item's processing amount is increased by its processing fill amount, and its resource value is set to its resource fill amount. In one embodiment, the item's processing amount will not be increased beyond a corresponding maximum value. Note, in one embodiment, the processing amount fill amount is the same for all items (and thus, is not necessarily maintained in a data structure individually for each item.) In one embodiment, the processing amount fill amount is not the same for all items, as, for example, one item (e.g., queue) might be allocated more bandwidth for sending packets than another item. In one embodiment, the resource value full amount is the same for all items (and thus, is not necessarily maintained in a data structure individually for each item.)

As determined in process block 510, if the processing amount or the resource value does not allow the item to be scheduled for processing (e.g., the processing amount is less than a predetermined constant value such as zero or determined via another comparison, or the resource value is less than or equal to a predetermined constant value such as zero or determined via another comparison), then processing returns to process block 504. Otherwise, as determined in process block 512, if the item should be scheduled (e.g., it requires processing and if it is not already scheduled), then in process block 514, the item is ensured to be made available to the scheduler for processing, such as, but not limited to providing an indication of the item to the scheduler, setting a processing eligibility bit, or placing an indication in a scheduling data structure, etc. Processing returns to process block 504.

When all items have be manipulated as determined in process block 504, processing returns to process block 502 to wait for the next expiration of the timer.

Figure 6:
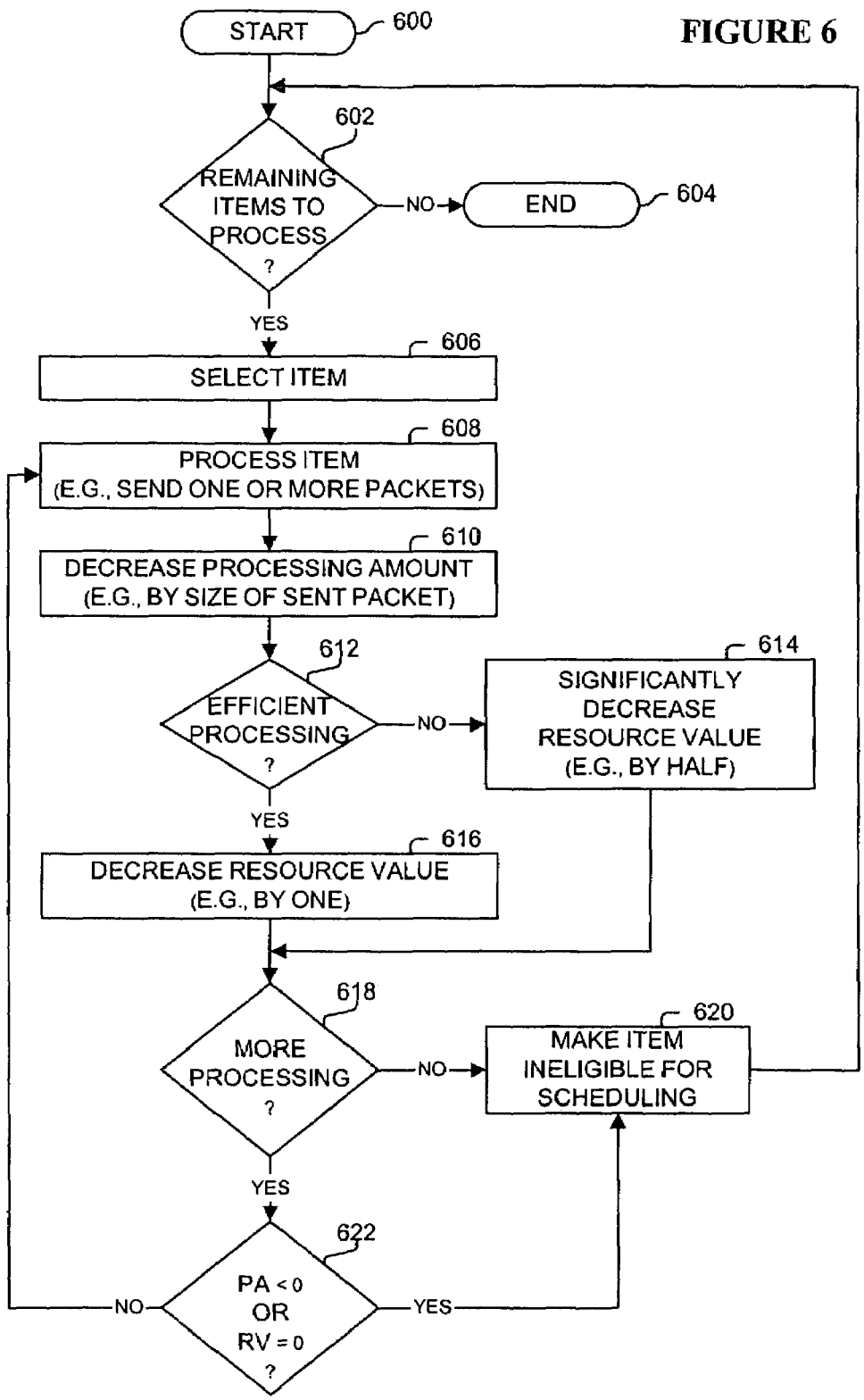
FIG. 6 is a flow diagram of a process used in one embodiment for scheduling using a resource value.
Figure 7:
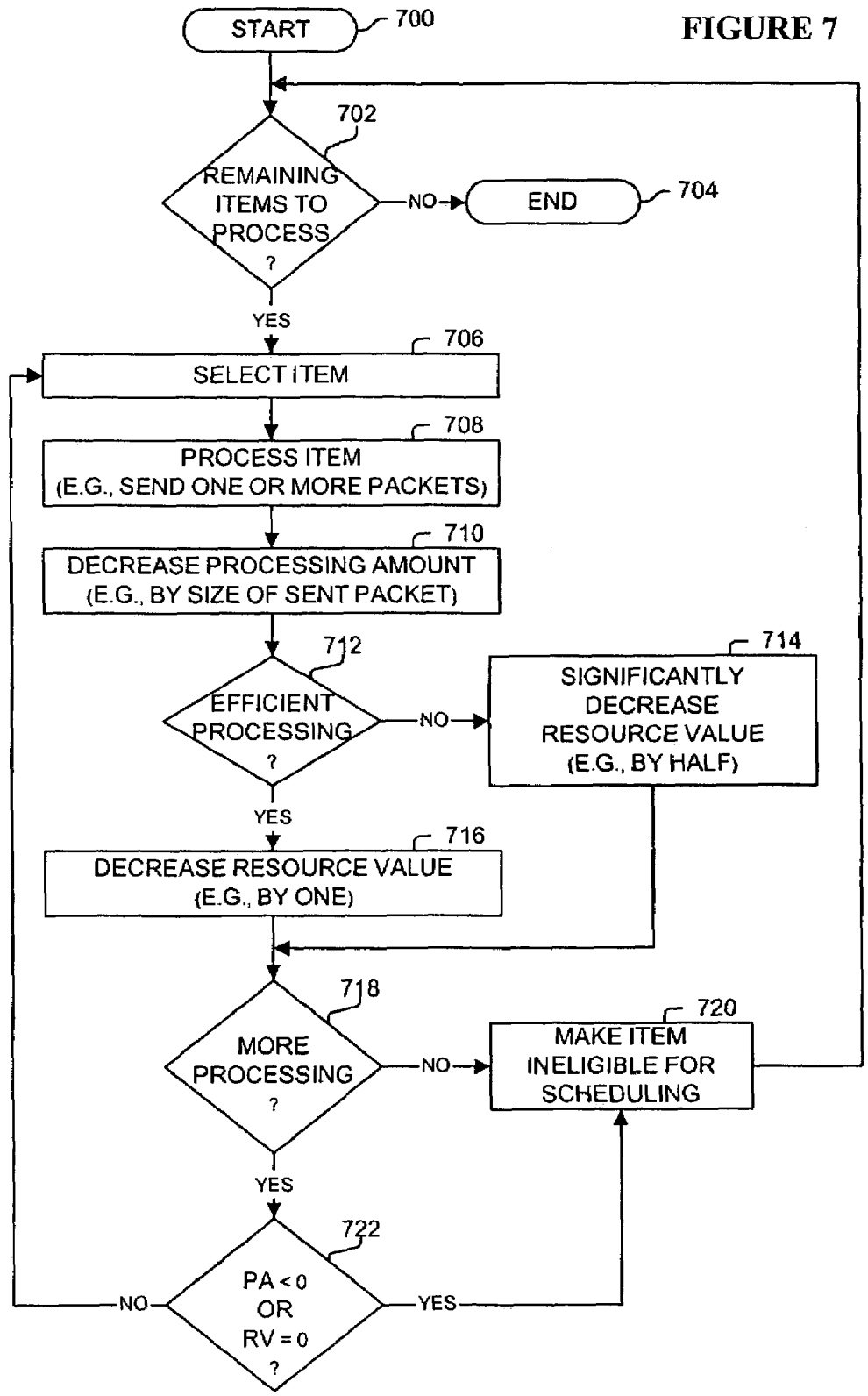
FIG. 7 is a flow diagram of a process used in one embodiment for scheduling using a resource value.

FIGS. 6 and 7 each illustrate a scheduling process used in one embodiment, which typically operates in parallel with the fill process illustrated in FIG. 5. The process illustrated in FIG. 6 processes an item (and/or entities thereof) requiring processing contiguously until it is determined that it does not have any more processing amount or resource value remaining; while the process illustrated in FIG. 7 repetitively sequences through the items requiring processing one after the other. Thus, for example, the process illustrated in FIG. 6 will process a first item fully, then a second item fully and so on, while the process illustrated in FIG. 7 will process one entity from the first item, then one entity from the second item, and so on, then return to process an entity from the first item, then one entity from the second item, and so on.

Turning to FIG. 6, processing begins with process block 600, and proceeds to process block 602. If there are items to process (e.g., at least one item has the requisite processing amount and resource value), then processing proceeds to process block 606. Otherwise, processing is complete for this period as indicated by process block 604.

In process block 606, an item, such as the first one if an ordered set is used or another item, is selected from the set of eligible items requiring processing. Next, in process block 608, the item is processed, which in one embodiment, includes processing an entity thereof (e.g., one or more packets stored in a queue). In process block 610, the processing amount of the item is decreased by some constant or variable value, such as the size of the sent one or more packets or other value commiserate with the processing performed.

In process block 612, the efficiency of the processing performed in process block 608 is evaluated. In one embodiment, the processing is deemed efficient if a predetermined or variable minimum threshold number of bytes or packets were processed or sent, or some other threshold amount of processing was performed, etc. Thus, in one embodiment, a simple comparison to a threshold value is used. Note, the determination of whether such processing was efficient or not, as well as the initial value to which the resource value is set and the manner of and values by which it is progressively decreased is extensible, and is typically defined per the invention to match the particular application of the invention.

If the processing performed in process block 608 is determined to be efficient, then in process block 616, the resource value is decreased by a first value, such as one or some other small amount. Otherwise, in process block 614, the resource value is decreased by a second amount, such as by approximately one-half or some large value. For example, if a resource value starts out at ten, and continuously inefficiently processes entities or items, then it may be decreased to five, two, one, then zero. In one embodiment, the resource value is right-shifted one position to divide by two. In one embodiment, integer or real number division is used, with possible truncation or rounding to ensure the value will eventually be decreased to or below a threshold value (e.g., zero or some other value). In one embodiment, the resource value is decreased by subtracting a second amount from its current value.

Next, as determined in process block 618, if the item requires does not require further processing (e.g., there are no more entities in the item, such as packets in a queue), then in process block 620, the item is removed from the set or otherwise indicated as ineligible as it has no more processing to be performed, and processing returns to process block 602.

Otherwise, as determined in process block 622, if the processing amount or the resource value does not allow the item to be scheduled for processing (e.g., the processing amount is less than a predetermined constant value such as zero or determined via another comparison, or the resource value is less than or equal to a predetermined constant value such as zero or determined via another comparison), then processing proceeds to process block 620; otherwise processing returns to process block 608.

Turning to FIG. 7, processing begins with process block 700, and proceeds to process block 702. If there are items to process (e.g., at least one item has the requisite processing amount and resource value), then processing proceeds to process block 706. Otherwise, processing is complete for this period as indicated by process block 704.

In process block 706, an item, such as the first one if an ordered set is used or another item, is selected from the set of eligible items requiring processing. Next, in process block 708, the item is processed, which in one embodiment, includes processing an entity thereof (e.g., one or more packets stored in a queue). In process block 710, the processing amount of the item is decreased by some constant or variable value, such as the size of the sent one or more packets or other value commiserate with the processing performed.

In process block 712, the efficiency of the processing performed in process block 708 is evaluated. In one embodiment, the processing is deemed efficient if a predetermined or variable minimum threshold number of bytes or packets were processed or sent, or some other threshold amount of processing was performed, etc. Thus, in one embodiment, a simple comparison to a threshold value is used. Note, the determination of whether such processing was efficient or not, as well as the initial value to which the resource value is set and the manner of and values by which it is progressively decreased is extensible, and is typically defined per the invention to match the particular application of the invention.

If the processing performed in process block 708 is determined to be efficient, then in process block 716, the resource value is decreased by a first value, such as one or some other small amount. Otherwise, in process block 714, the resource value is decreased by a second amount, such as by approximately one-half or some large value. For example, if a resource value starts out at ten, and continuously inefficiently processes entities or items, then it may be decreased to five, two, one, then zero. In one embodiment, the resource value is right-shifted one position to divide by two. In one embodiment, integer or real number division is used, with possible truncation or rounding to ensure the value will eventually be decreased to or below a threshold value (e.g., zero or some other value). In one embodiment, the resource value is decreased by subtracting a second amount from its current value.

Next, as determined in process block 718, if the item requires does not require further processing (e.g., there are no more entities in the item, such as packets in a queue), then in process block 720, the item is removed from the set or otherwise indicated as ineligible as it has no more processing to be performed, and processing returns to process block 702.

Otherwise, as determined in process block 722, if the processing amount or the resource value does not allow the item to be scheduled for processing (e.g., the processing amount is less than a predetermined constant value such as zero or determined via another comparison, or the resource value is less than or equal to a predetermined constant value such as zero or determined via another comparison), then processing proceeds to process block 720; otherwise processing returns to process block 706.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for scheduling, the method comprising:
   identifying an item;
   processing the item;
   decreasing a processing amount of the item by a value;
   decreasing a resource value by a first amount if said processing of the item equaled or exceeded a threshold otherwise decreasing the resource value by a second amount; and
   determining if the processing amount and the resource value allow the item to be further processed;
   wherein a group including said processing the item, said decreasing the processing amount, said decreasing the resource value, and said determining is repeatedly performed on the item until said determining determines that the processing amount or the resource value does not allow the item to be further processed.

2. The method of claim 1, wherein the first amount is one.

3. The method of claim 2, wherein the second amount is approximately half of the resource value.

4. The method of claim 3, wherein the resource value is greater than or equal to one.

5. The method of claim 4, wherein the resource value is greater than or equal to six.

6. The method of claim 1, wherein said decreasing the resource value by the second amount includes dividing the resource value by two.

7. The method of claim 1, wherein the item corresponds to a queue.

8. The method of claim 7, wherein said processing the item includes sending one or more packets.

9. The method of claim 8, wherein the threshold includes sending two packets.

10. The method of claim 1, wherein the item represents a process, thread, or information stream.

11. The method of claim 1, wherein the processing amount includes a token bucket.

12. The method of claim 1, wherein the processing amount includes a deficit.

13. A computer-readable medium tangibly encoded therein with computer-executable instructions for performing steps when executed by one or more processors for performing scheduling, said steps comprising:
(a) processing an item;
(b) decreasing a processing amount of the item by a value;
(c) decreasing a resource value by a first amount if said processing of the item equaled or exceeded a threshold otherwise decreasing the resource value by a second amount; and
(d) in response to determining that the processing amount and the resource value allow the item to be further processed, repeating steps (a), (b), (c) and (d) to further process the item, else if a next item is available for processing: selecting the next item as the item and repeating steps (a), (b), (c) and (d) for processing said selected next item.

14. The computer-readable medium of claim 13, wherein the first amount is one, and the second amount is approximately half the resource value.

15. The computer-readable medium of claim 13, wherein the processing amount includes a token bucket or a deficit.

16. An apparatus for scheduling, the apparatus comprising:
means for identifying an item;
means for processing the item;
means for decreasing a processing amount of the item by a value;
means for decreasing a resource value by a first amount if said processing of the item equaled or exceeded a threshold otherwise decreasing the resource value by a second amount; and
means for determining if the processing amount and the resource value allow the item to be further processed;
wherein said means for processing the item includes means for processing the item further in response to said means for determining if the processing amount and the resource value allow the item to be further processed determines that the processing amount and the resource value allow the item to be further processed.

17. The apparatus of claim 16, comprising means for determining the second amount based on the resource value.

18. The apparatus of claim 17, wherein said means for determining the second amount based on the resource value includes means for dividing the resource value by two.

19. The apparatus of claim 16, wherein said means for decreasing the resource value included means for subtracting the first amount from the resource value.

20. The apparatus of claim 17, wherein the first amount is one.

21. The apparatus of claim 16, wherein the processing amount includes a token bucket or a deficit.

22. An apparatus for scheduling, the apparatus comprising:
a plurality of queues for buffering a plurality of packets; and
a scheduler to perform scheduling of the sending of packets from the plurality of packets, the scheduler including:
control logic; and
one or more memory devices configured to maintain indications of queues of the plurality of queues requiring processing to be performed;
wherein said scheduling includes:
(a) processing a particular queue of the plurality of queues;
(b) decreasing a processing amount of the particular queue by a value;
(c) decreasing a resource value by a first amount if said processing of the particular queue equaled or exceeded a threshold otherwise decreasing the resource value by a second amount; and
(d) in response to determining that the processing amount and the resource value allow the particular queue to be further processed, repeating steps (a), (b), (c) and (d) to further process the particular queue, else if a next queue is ready for processing: selecting the next queue of the plurality of queues as the particular queue and repeating steps (a), (b), (c) and (d) for processing said selected next queue.

23. The apparatus of claim 22, wherein the first amount is one.

24. The apparatus of claim 23, wherein the second amount is approximately half of the resource value.

25. The apparatus of claim 24, wherein the resource value is greater than or equal to one.

26. The apparatus of claim 25, wherein the resource value is greater than or equal to six.

27. The apparatus of claim 22, wherein said decreasing the resource value by the second amount includes dividing the resource value by two.

28. The apparatus of claim 22, wherein a group including said processing the particular queue, said decreasing the processing amount, said decreasing the resource value, and said determining is repeatedly performed by the scheduler on the particular queue until said determining determines that the processing amount or the resource value does not allow the particular queue to be further processed.

29. The apparatus of claim 22, wherein the processing amount includes a token bucket or a deficit.

* * * * *

UNITED STATES PATENT AND TRADEMARK OFFICE
CERTIFICATE OF CORRECTION

PATENT NO. : 7,350,208 B1  
APPLICATION NO. : 10/334579  
DATED : March 25, 2008  
INVENTOR(S) : Shoham Page 1 of 1

It is certified that error appears in the above-identified patent and that said Letters Patent is hereby corrected as shown below:

Col. 13, line 18, replace "computer-readable medium" with -- computer-storage medium --

Col. 13, line 35, replace "computer-readable medium" with -- computer-storage medium --

Col. 13, line 38, replace "computer-readable medium" with -- computer-storage medium --

Col. 13, line 40, replace "An apparatus for scheduling" with -- An apparatus including one or more processors for scheduling --

Col. 13, line 53, replace "means for processing the item" with -- means for repeatedly processing the item --

Col. 13, line 53, replace "item further in" with -- item in --

Col. 14, line 14, replace "control logic" with -- one or more processors --

Signed and Sealed this

Twenty-ninth Day of December, 2009

David J. Kappos
*Director of the United States Patent and Trademark Office*